United States Patent [19]

Motsch

[11] Patent Number: 4,651,632
[45] Date of Patent: Mar. 24, 1987

[54] COFFEE PERCOLATOR

[75] Inventor: Hans Motsch, Geislingen/Steige, Fed. Rep. of Germany

[73] Assignee: Wuerttembergische Metallwarenfabrik AG., Fed. Rep. of Germany

[21] Appl. No.: 808,616

[22] Filed: Dec. 13, 1985

[51] Int. Cl.[4] .............................................. A47J 31/00
[52] U.S. Cl. .................................... 99/283; 99/289 R
[58] Field of Search ................. 99/280, 281, 282, 283, 99/289 R; 426/433

[56] References Cited

U.S. PATENT DOCUMENTS 3,064,553 11/1962 Simjian .............................. 99/289 R
3,288,049 11/1966 Schmid .............................. 99/289 R
3,379,117 4/1968 Richeson ................................ 99/283

FOREIGN PATENT DOCUMENTS 2657355 6/1978 Fed. Rep. of Germany .... 99/289 R
402319 5/1966 Switzerland ...................... 99/289 R Primary Examiner—Billy J. Wilhite
Attorney, Agent, or Firm—Arnold, White & Durkee

[57] ABSTRACT

Described is a coffee percolator the brewing cycle of which is controlled by control means. This coffee percolator is provided with further control means effective to initiate and to control a hot flushing operation for preheating those parts of the coffee percolator which come into contact with the coffee separately from the brewing cycle proper.

8 Claims, 5 Drawing Figures

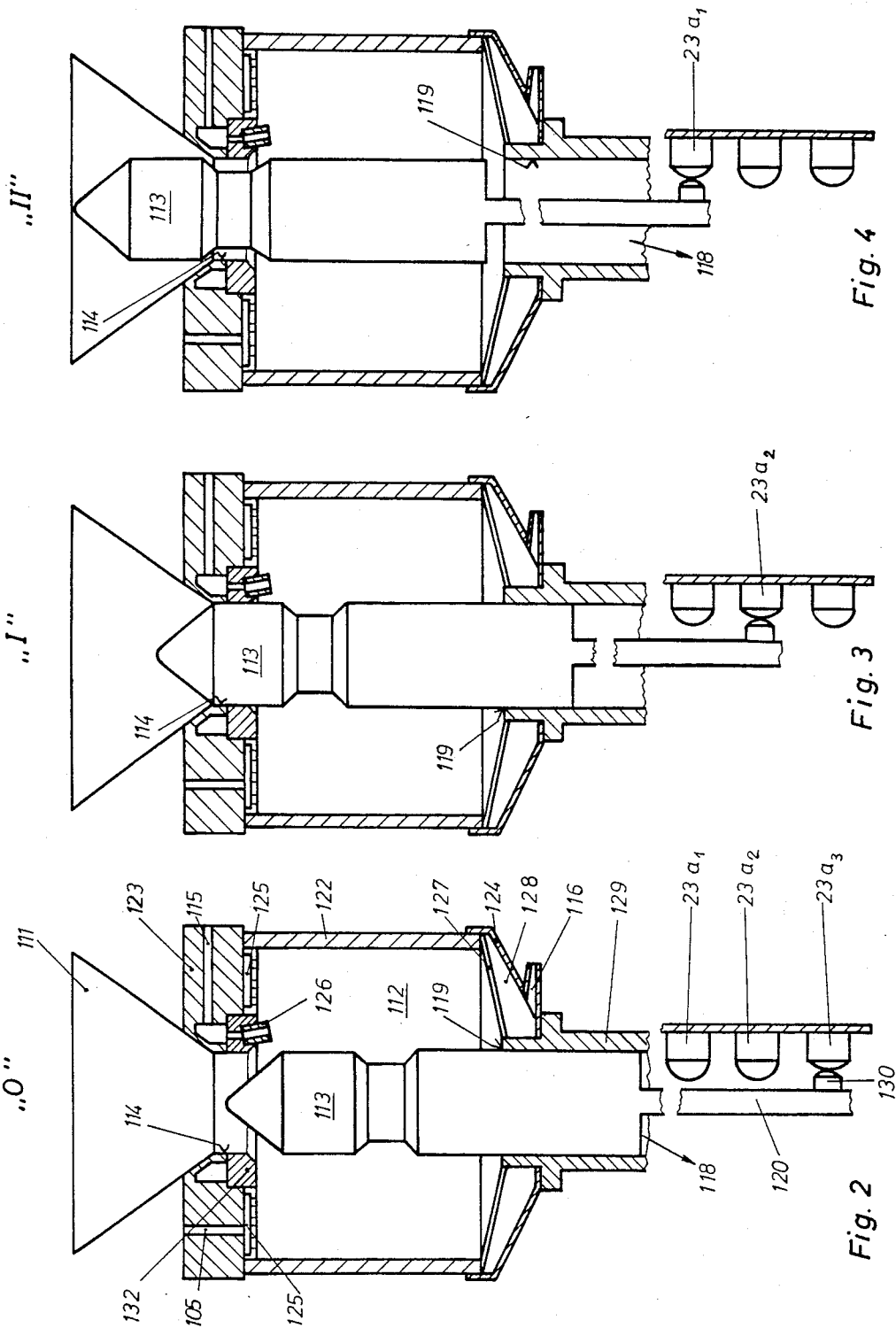

COFFEE PERCOLATOR

DESCRIPTION

The present invention relates to a coffee percolator comprising a brewing chamber adapted to be supplied with coffee meal and hot water for making coffee in a brewing cycle. The brewing cycle is controlled by control means activated by a manual selector switch for controlling the desired brewing process by first supplying a properly metered amount of coffee meal and subsequently admitting a corresponding amount of hot water.

BACKGROUND OF THE INVENTION

The control principle of a coffee percolator of this type is known for instance from German Patent No. 1,454,109. According to this known control procedure, the hot water feed to the brewing chamber is opened only when a brewing process is to be carried out. On starting operation of the coffee percolator after an extended rest period, the parts of the coffee percolator coming into contact with the hot water and the finished coffee are still cold, so that the coffee made in the first brewing process does not meet quality standards, that is, the coffee is too cold and its flavour is unsatisfactory. It may furthermore happen that after cleaning the percolator, residues of the cleaning water and possibly added detergents remain in the percolator so as to mix with the first coffee charge. In addition, the previously supplied water remains in the water heating container of the coffee percolator also during a rest period, so that it is cooled and degassed. The preparation of coffee with such stale water likewise results in a lowering of quality. These shortcomings are at present countered by discarding the first charge of the percolated coffee. This procedure is obviously rather uneconomical.

SUMMARY OF THE INVENTION

It is therefore an object of the invention to improve a coffee percolator operating in a brewing cycle controlled by control means in such a manner that an economical operation is made possible with uniform quality of the coffee made in each brewing cycle.

It is a further object of the invention to improve a coffee percolator operating in a brewing cycle controlled by control means in such a manner that a pre-heating of the percolator is made possible after a rest period.

It is a still further object of the invention to improve a coffee percolator operating in a brewing cycle controlled by control means and comprising a main switch for activating and deactivating the percolator in such a manner that a pre-heating of the percolator takes place after actuation of the main switch.

A still further object of the invention is the provision of a coffee percolator operating in a brewing cycle controlled by control means and comprising a main switch for activating and deactivating the percolator, wherein actuation of the main switch to activate the percolator after a rest period causes the percolator to be pre-heated with the main switch in its closed state.

Further objects of the invention will become evident from the following description in connection with the accompanying drawings.

BRIEF DESCRIPTION OF THE DRAWINGS

An embodiment of the invention shall now be described by way of example with reference to the drawings, wherein:

FIG. 2 shows the brewing section of the percolator of FIG. 1 in a first position during the brewing cycle, FIG. 3 shows the brewing section of the percolator of FIG. 1 in a second position during the brewing cycle, FIG. 4 shows the brewing section of the percolator of FIG. 1 in a third position during the brewing cycle.

DESCRIPTION OF THE PREFERRED EMBODIMENTS

Figure 1:
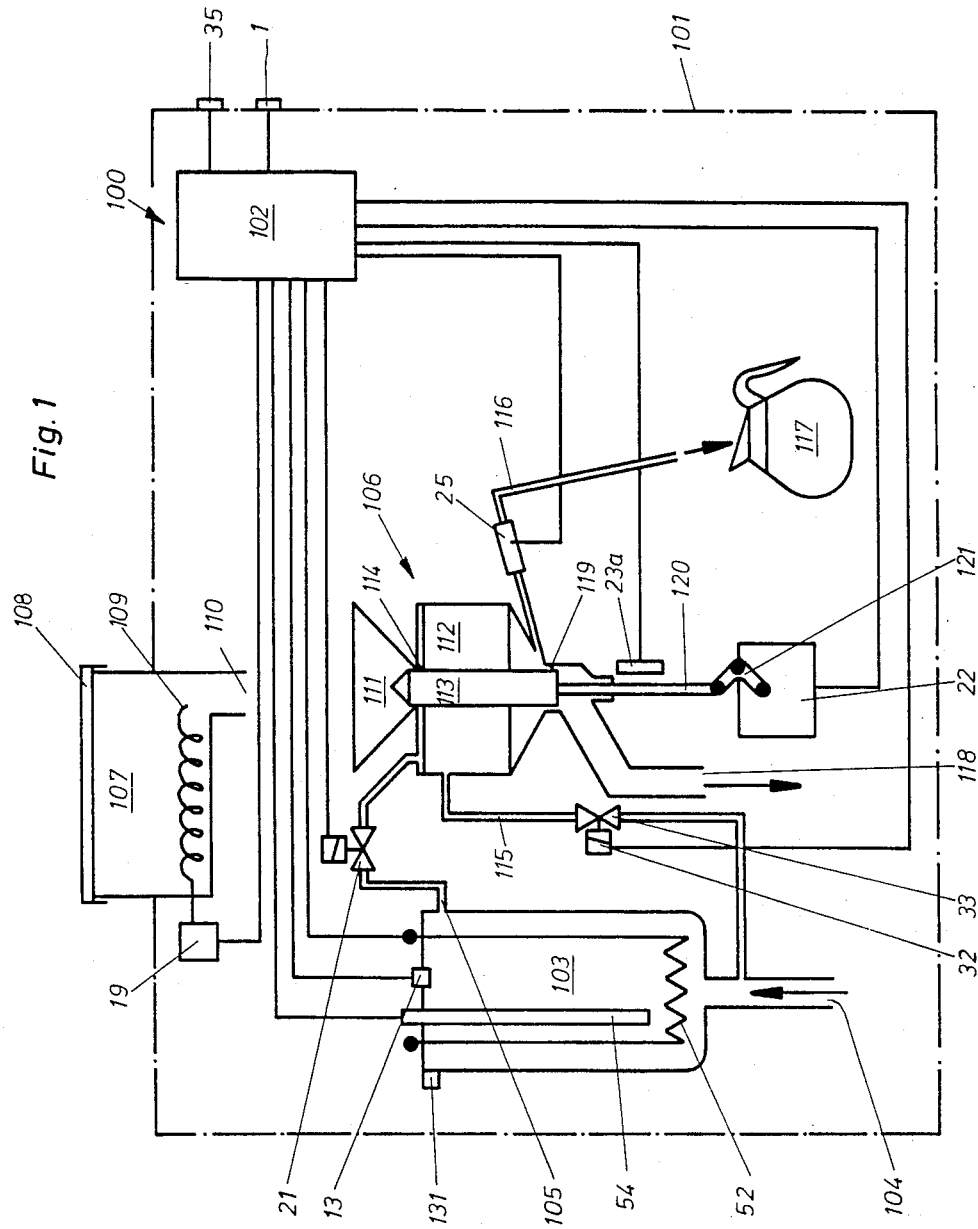
FIG. 1 shows a diagrammatical representation of a coffee percolator to which the invention may be applied.

Diagrammatically shown in FIG. 1 is a coffee percolator 100 to which the invention may be applied. It is noted, however, that the application of the invention is not restricted to the described coffee percolator as illustrated in the drawings.

Coffee percolator 100 has a housing 101 shown in dash-dotted lines. Acommodated within housing 101 are the merely diagrammatically indicated components required for making coffee as described in the following, a control unit 102 being provided for controlling each individual brewing cycle initiated by the actuation of a manual selector switch 35 after coffee percolator 100 has been activated by the actuation of a main switch 1.

Provided within housing 101 is a water heating container 103 adapted to be supplied with cold water from outside of housing 101 through a feed pipe 104. The supplied cold water is heated by means of a heater 52 disposed within water heating container 103 and controlled by control unit 102, numeral 131 indicating a pressure relief valve of the type conventionally employed in steam boilers and similar vessels. The desired temperature is maintained by means of a thermostat 54 and control unit 102. Also disposed within water heating container 103 is a temperature sensor 13 for reporting the attainment of the brewing temperature to control unit 102. Extending from an upper portion of water heating container 103 is a hot water pipe 105 adapted to be opened and closed by a hot water valve 21 under the control of control unit 102. Hot water pipe 105 opens into a brewing section 106 to be described in detail as the description proceeds.

Disposed above brewing section 106 is a coffee meal reservoir 107 which is accessible from the exterior of housing 101 on removal of a cover 108 for the supply of coffee meal thereto. A screw conveyor 109 disposed within reservoir 107 is driven by a motor 19 under the control of a control unit 102. The control operation is carried out in such a manner that screw conveyor 109 is rotated for a predetermined number of revolutions for conveying the desired amount of coffee meal through an outlet 110 at the bottom of reservoir 107 into a filling funnel 111 of brewing section 106. Disposed subjacent filling funnel 111 is a brewing chamber 112 communicating with filling funnel 111 through a passage 114 adapted to be opened and closed by a control piston 113. Hot water pipe 105 extending from water heating container 103 opens in an upper portion of brewing chamber 112, as does a flushing pipe 115 branched off cold water supply pipe 104 and adapted to be opened and closed by a valve 33 under the control of control unit 102. A discharge pipe 116 for the finished coffee extends from a lower portion of brewing chamber 112 and is provided with a flow meter 25 connected to control unit 102. Discharge pipe 116 has its end outside housing 101, so that a suitable receptacle, in the example shown a jug 117, may be placed therebelow for receiving the percolated coffee beverage. The lower portion of brewing chamber 112 communicates with an outlet tube 118 through an outlet opening 119 adapted to be closed or opened by control piston 113 for discharging the exhausted coffee-grounds to the exterior of housing 101. A linkage 120 and a transmission 121 connect control piston 113 to a motor 22 controlled by control unit 102. The positions of linkage 120 are sensed by a series of switches 23a and reported back to control unit 102.

The different positions of control piston 113 within a brewing cycle shall now be discussed in detail with reference to FIGS. 2 to 4. As diagrammatically shown in these figures, brewing chamber 112 comprises a substantially cylindrical sideall 122 the upper and lower ends of which are closed respectively by a cover 123 and a bottom 124. Provided in cover 123 is an annular distribution nozzle system 125 for uniformly distributing the hot water supplied via hot water pipe 105 within brewing chamber 112. An injection nozzle 126 is mounted in cover 123 by means of a rotatable ring 132 adapted to be rotated together with injection nozzle 126 by the reaction force of the latter. The cold flushing water is supplied via flushing conduit 115. The resulting water jet loosens the coffee-grounds for conveyance towards outlet opening 119.

Disposed above bottom 124 at a spaced location is a filter 127, so that between filter 127 and bottom 124 there is formed a collecting space 128 from which discharge pipe 116 for the percolated coffee branches off. Lower opening 119 is formed by the inner bore of a sleeve 129 which forms part of the coffee-grounds outlet tube 118 and in which control piston 113 is sealingly guided. Both filter 127 and bottom 124 are connected to sleeve 129 in a manner to isolate collecting space 128 from outlet tube 118. Linkage member 120 carries a cam member 130 disposed in spaced relationship opposite the actuators of the three switches $23a_1$, $23a_2$ and $23a_3$, so that vertical displacement of linkage member 120 results in cam memebr 130 depressing and releasing the actuators of respective switches 23a.

FIG. 2 shows control piston 113 at its rest position 0. This position is assumed at the end of each brewing cycle. In the rest position 0 shown, control piston 113 closes lower opening 119 and keeps upper opening 114 open. The rest position O is identified by the lowermost switch $23a_3$.

As a brewing process is now initiated in the manner to be described below, brewing chamber 112 is at first supplied with coffee meal via filling funnel 111 and opening 114, the conical top end of control piston 113 being effective to evenly distribute the coffee meal so as to form a layer of uniform thickness on filter 127. Control piston 113 is subsequently displaced to the brewing position I shown in FIG. 3 in which position it closes both openings 114 and 119. This brewing position I is identified by the central switch $23a_2$. As this position is reported back to control unit 102, motor 22 is stopped and valve 21 is opened for the supply of hot water via hot water pipe 105.

After the preselected amount of coffee has been brewed, control piston 113 is displaced to the flushing position II shown in FIG. 4 in which at least lower opening 119 is released. This flushing position II is identified by the uppermost switch $23a_1$. As control piston 113 is at the flushing position II, valve 33 is opened, so that flushing water may be sprayed into brewing chamber 112 from cold water pipe 115 for flushing the exhausted coffee-grounds out through outlet tube 118.

The control of the brewing cycles shall now be explained in detail with reference to the circuit diagram of FIG. 5. Control unit 102 substantially comprises two different control subunits 102a, 102b, the separation between the components of the two subunits 102a and 102b extending generally along the dash-dotted line in FIG. 5.

The following description shall first be directed to control subunit 102a. When main switch 1 is actuated for activating the coffee percolator, for instance in the morning or at opening time of a catering business, a transformer 4 is energized via a pair of conductors 2, 3 for supplying a control voltage. Connected to transformer 4 is a capacitor 6, the charging of which produces a power up reset signal (PUR). This causes an inverter 5 to generate a short-time high-signal for setting a flip-flop 7 associated with the hot-flushing procedure. Output Q of flip-flop 7 is connected to an AND gate 9. A further conductor 8 connects AND gate 9 to a decoder 24 which identifies the signals applied thereto by switches $23a_1$, $23a_2$ and $23a_3$. The output of AND gate 9 is connected via a conductor 10 to a further AND gate 11, which is again connected via a conductor 12 to an OR gate 15, the output of which is connected to a timer 16. Also connected to AND gate 11 via a conductor 14 is temperature sensor 13. The output signal of flip-flop 7 is thus effective to activate timer 16 only when the required brewing temperature has been attained in water heating container 103. Timer 16 then operates to control the timed sequence of the various process steps. Timer 16 is only diagrammatically indicated, since components of this type are sufficiently known from the state of the art. It contains a number of switching circuits operating in a suitable and well-known manner for actuating a contact 17 for motor 19 of the coffee meal screw conveyor, a contact 20 for valve 21 in hot water pipe 105, a contact 23 for motor 22 of the control piston, and a contact 32 for valve 33 in the flushing water supply.

When flip-flop 7 has been set, conductor 10 supplies current to an OR gate 18 effective to prevent contact 17 from being closed for starting motor 19, so that no coffee meal is metered out as flip-flop 7 is in its set condition. Timer 16 operates to close contact 20 for opening hot water valve 21. As a result, hot water flows from the water heating container into the brewing chamber. Motor 22 is activated by closing contact 23 for the displacement of the control piston from its rest position O to its brewing position I, at which position switch $23a_2$ is actuated to apply an output signal to decoder 24, causing timer 16 to stop the operation of the motor. The supplied hot water heats the brewing section and is discharged through the discharge pipe containing flow meter 25. The flow meter generates a series of pulses which are counted by a counter 26, in the present example a 12 bit binary counter. After the number of pulses pre-set by a switch 27 has been attained, a signal is applied to timer 16 via an AND gate 28, an AND gate 29, and OR gate 30 and a conductor 30a.

This causes contact 20 to be opened and contact 23 to be closed, resulting in hot water valve 21 being closed and motor 22 being energized. Motor 22 remains energized until switch 23$a_1$ reports to timer 16 that the control piston has reached its flushing position II, whereupon motor 22 is deenergized. In the set state of flip-flop 7, contact 32 for flushing valve 33 is kept open via conductor 31, so that no cold water is injected for cleaning the brewing chamber. After a predetermined interval timer 16 causes contact 23 to be closed, so that motor 22 is started for returning the control piston from its flushing position II to its rest position O. As the control piston arrives at its rest position O, switch 23$a_3$ applies an output signal to decoder 24, causing timer 16 to generate a signal for resetting flip-flop 7 via reset conductor 34. As a result, timer 16 is no longer controlled via conductors 10 and 12.

At this time the first brewing cycle may be initiated. To this purpose, manual selector switch 35 is actuated to set a flip-flop 36. OR gate 15 generates a signal at its output Q for starting timer 16. Since there is now no signal from flip-flop 7, contacts 17 and 32 are no longer kept open, so that the normal brewing cycle can proceed as follows: In the first place timer 16 causes contact 17 of motor 19 to be closed. Motor 19 operates to rotate the screw conveyor for conveying coffee meal into the brewing section. Thereupon the control piston is moved from its rest position O to the brewing position I, this position of the control piston being identified by the respective switch 23a in the manner already explained. Subsequently contact 20 is closed for opening hot water valve 21, so that hot water is admitted to the brewing section. The hot water percolates through the layer of coffee meal on the filter to extract flavouring and other substances therefrom, the thus percolated coffee beverage being discharged via the collecting space and the discharge pipe provided with flow meter 25. Flow meter 25 operates to apply the pulses referred to above to counter 26. In the case of the coffee brewing cycle, flip-flop 7 is in its reset condition, so that no voltage is applied to conductor 31, the amount of coffee to be made being pre-set by means of a preselector switch 37. An inverter 52 applies a signal to a conductor 53 for activating an AND gate 39, while AND gate 29 is deactivated. When counter 26 arrives at the pulse count corresponding to the amount of coffee preset by preselector switch 37, AND gates 38 and 39 are switched through, and a signal is applied to timer 16 via OR gate 30, resulting in contact 20 being opened for closing hot water valve 21. Closing of contact 23 subsequently activates motor 22 for displacing the control piston from its brewing position I to its flushing position II. This position of the control piston is again identified by switch 23$a_1$ and decoder 24, causing motor 22 to be deenergized. Timer 16 subsequently causes contact 32 to be closed for opening flushing valve 33. The thereupon injected cold flushing water flushes the exhausted coffee-grounds and cleans the brewing section. After a predetermined period timer 16 operates to close contact 23, causing motor 22 to displace the control piston from its flushing position II back to its rest position 0. The brewing cycle is finalized by resetting flip-flop 36 via reset conductor 34, whereupon a further brewing cycle may be initiated by renewed actuation of manual selector switch 35.

Figure 5:
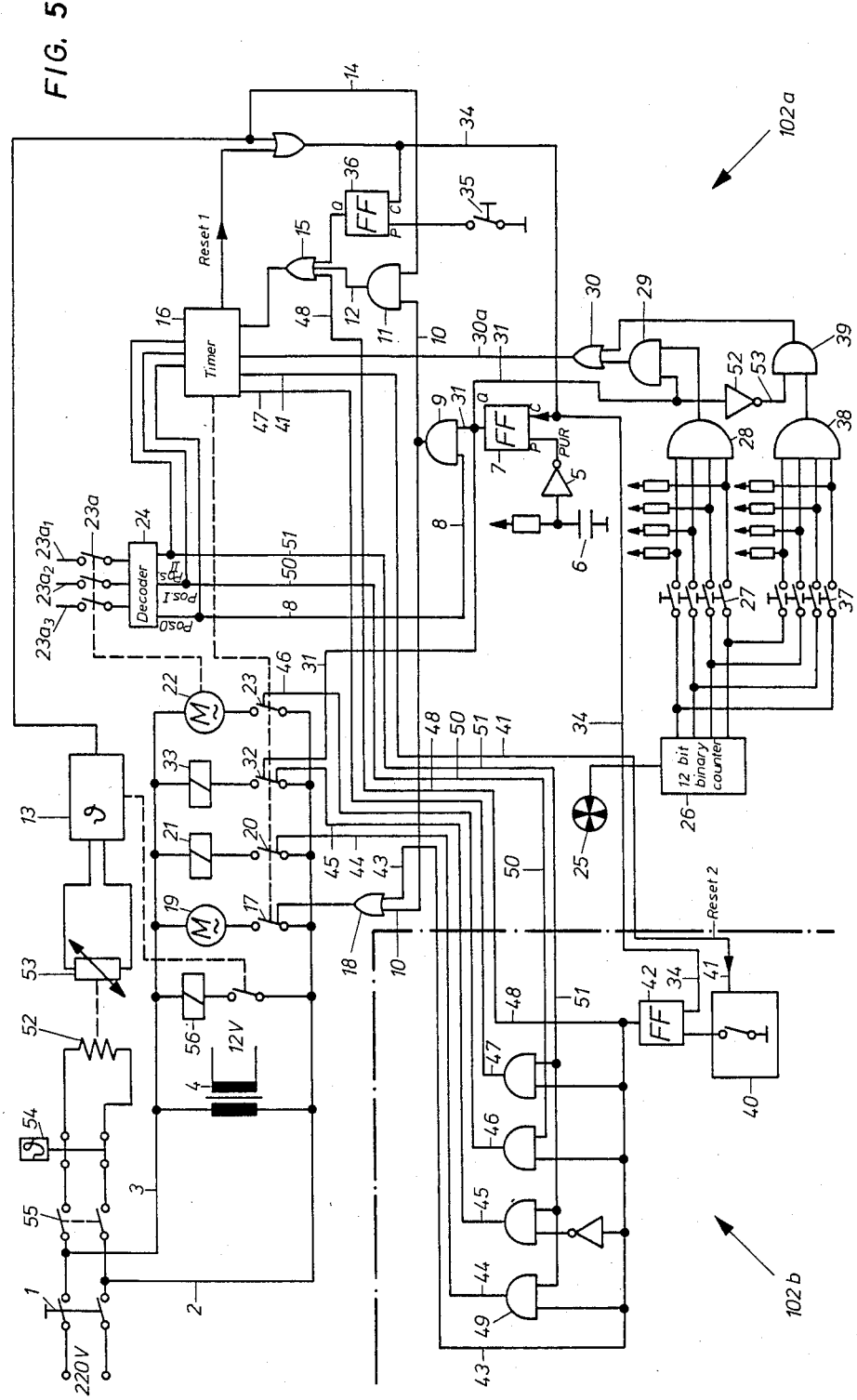
FIG. 5 shows a block circuit diagram of the coffee percolator according to the invention.

The circuit diagram is completed by the representation at the upper lefthand side of FIG. 5 of structural components relating to temperature control and overheating safety controls. Components of this type are generally known, as are their operation and circuitry connections, so that a detailed description thereof may be omitted. The components shown specifically include a safety temperature sensor 53, a switch contact of temperature sensor 13, and a safety switch or fuse 56.

An advantageous improvement of the control arrangement for the coffee percolator provides that a hot flushing cycle is automatically initiated after an extended rest period of the percolator in its activated state, i.e. with the main switch 1 in its actuated state. To achieve this object, the above described control subunit 102a is supplemented by the electric components included in control subunit 102b.

The control subunit 102b shall now be described as follows: Control subunit 102b includes a timing switch 40 which may be set to a desired time interval, such interval corresponding to the period of time at the end of which a hot flushing cycle is to be carried out unless a brewing cycle has been initiated in the meantime. The length of the selected time depends on environmental conditions, for instance on the temperature of the room in which the coffee percolator is installed. Timing switch 40 is connected to timer 16 via a conductor 41 to transmit a reset signal through this conductor 41 whenever a brewing cycle is initiated by actuation of manual selector switch 35. This reset signal is effective to reset the timing switch to zero on the initiation of each brewing cycle. If a brewing cycle is not initiated during the selected interval, timing switch 40 operates to set a flip-flop 42 to apply a signal to timer 16 via conductor 48 for initiating a hot flushing cycle. Contact 17 is kept open via a conductor 43, so that motor 19 of the coffee meal conveyor is not activated Contact 23 is closed via a conductor 46 to activate motor 22 for displacing the control piston to its flushing position II via its brewing position I. Only after the flushing position II has been reached, contact 20 is closed via an AND gate 49 and a conductor 44 for opening hot water valve 21. The hot water now flows through the hot water pipe into the brewing section, and from there, since the lower opening is not closed by the control piston, not through the outlet provided for the percolated coffee, but directly through the outlet tube provided for the exhausted coffee-grounds. In this manner it is avoided that a receptacle previously under the coffee dispensing outlet is filled with hot water, or that coffee contained in the receptacle is diluted. In this situation it is ensured via a connection 50 that the motor 22 for the control piston is only activated via conductor 46 and contact 23 when the control piston is in its rest position O or in its brewing position I. A connection 51 ensures that contact 20 can only be closed with the control piston in its flushing position II, so that the hot flushing process can only take place in the flushing position II. Via conductor 47 it is further possible to vary the period of time set in the timer 16 for the admission of hot water, i.e. the period of time during which hot water valve 21 is open, since this period of time is in this case no longer controlled by flow meter 25 and counter 26.

The contact 32 remains opened, i.e. cold water flushing valve 33 remains closed, due to a voltage being applied via conductor 45. After the preselected time, timer 16 causes contact 20 to be opened and contact 23 to be closed for energizing motor 22, so that the control piston is returned from its flushing position II to its rest position O. Flip-flop 42 is then again reset via conductor 34, whereupon manual selector switch 35 may be actuated for initiating a brewing cycle.

For initiating the hot flushing operation after an extended rest period with the coffee percolator in the activated state it is also possible to employ a timing switch connected to the manual selector switch in such a manner that actuation of the manual selector switch after a preselected rest period of the coffee percolator is effective to first initiate a hot flushing operation prior to the selected brewing cycle being carried out. Instead of a resettable timing switch it is also possible to employ a fixedly preset timing switch for initiating a hot flushing operation at predetermined time intervals. A timing switch of this type may usefully be employed in such cases in which regularly recurring rest periods of the coffee percolator are to be expected, for instance in the case of canteens, hospitals and the like. The setting of the timing switch may in these cases be selected in accordance with the expected rest periods so as to automatically initiate hot flushing operations during these periods.

It will be obvious to those skilled in the art that the described and illustrated embodiment is not the only possibility of implementation of the invention as claimed in the claims, and that numerous modifications thereof are possible without leaving the scope of the claims.

We claim:

1. A coffee percolator comprising a brewing chamber, means for supplying coffee meal to said brewing chamber, a hot water conduit opening into said brewing chamber and provided with closure means, control means for actuating said coffee meal supply means and said closure means in said hot water conduit one after the other in timed sequence during one brewing cycle for brewing coffee, and comprising additional control means for actuating said closure means in said hot water conduit for carrying out a hot flushing operation separate from said brewing cycle.

2. A coffee percolator comprising a brewing chamber, means for supplying coffee meal to said brewing chamber, a hot water conduit opening into said brewing chamber and provided with closure means, a main switch, control means for actuating said coffee meal supply means and said closure means in said hot water conduit one after the other in timed sequence during a brewing cycle for brewing coffee, and control means for actuating said closure means of said hot water conduit after actuation of said main switch for carrying out a hot flushing operation prior to initiation of the first brewing cycle.

3. A coffee percolator according to claim 2, wherein said control means for initiating a brewing cycle include a timer for actuating said coffee meal supply means and said closure means of said hot water conduit one after the other in timed sequence, and wherein said control means for carrying out a hot flushing operation include a flip-flop adapted to be set by said main switch via an electric conductor and connected via respective electric conductors to said timer and to said coffee meal supply means, so that said coffee meal supply means cannot be actuated with said flip-flop in its set condition.

4. A coffee percolator comprising a brewing chamber, means for supplying coffee meal to said brewing chamber, a hot water conduit opening into said brewing chamber and provided with closure means, a main switch, control means for actuating said coffee meal supply means and said closure means of said hot water conduit one after the other in timed sequence during a brewing cycle for brewing coffee, control means for actuating said closure means of said hot water conduit after actuation of said main switch for carrying out a hot flushing operation prior to initiation of the first brewing cycle, and control means for carrying out a hot flushing operation between two brewing cycles with said main switch in its actuated condition.

5. A coffee percolator according to claim 4, wherein said control means for initiating a brewing cycle include a timer for actuating said coffee meal supply means and said hot water closure means one after the other in timed sequence, wherein said control means for carrying out a hot flushing operation include a flip-flop adapted to be set by said main switch via an electric conductor and connected via respective electric conductors to said timer and said means for supplying coffee meal, so that said coffee meal supply means cannot be actuated with said flip-flop in its set condition, and wherein said control means for initiating a hot flushing operation between two brewing cycles include a timing switch and a flip-flop connected to said timer, said timing switch being effective to initiate a hot flushing operation on expiry of a predetermined interval after the initiation of a brewing cycle and prior to the initiation of another brewing cycle.

6. A coffee percolator comprising a brewing chamber having an upper opening for the supply thereto of coffee meal, and a lower opening for the discharge of exhausted coffee-grounds, said upper and lower openings being adapted to be selectively or contemporaneaously closed or opened by means of a control piston itself adapted to be displaced by suitable drive means, means for supplying coffee meal to said brewing chamber, a hot water conduit opening into said brewing chamber and provided with closure means, a main switch, control means for actuating said control piston drive means, said coffee meal supply means and said closure means of said hot water conduit one after the other in timed sequence during a brewing cycle for brewing coffee, during which said control piston assumes a brewing position closing said upper and said lower openings, and control means for carrying out a hot flushing operation after actuation of said main switch and prior to the initiation of a first brewing cycle, said hot flushing operation control means being effective to initially actuate said control piston drive means until said control piston is in its brewing position, and to subsequently actuate said closure means of said hot water conduit for the introduction of hot water into said brewing chamber.

7. A coffee percolator comprising a brewing chamber having an upper opening for the supply thereto of coffee meal and a lower opening for the discharge of exhausted coffee-grounds, said upper and lower opening being adapted to be selectively or contemporaneously closed and opened by means of a control piston itself adapted to be displaced by associated drive means, means for supplying coffee meal to said brewing chamber, a hot water conduit opening into said brewing chamber and provided with closure means, a main switch, a conduit for the supply of flushing water opening into said brewing chamber and provided with closure means, control means for actuating said control piston drive means, said coffee meal supply means, said closure means of said hot water conduit, and said closure means of said flushing water conduit one after the other in timed sequence during a brewing cycle for brewing coffee, said control piston in a brewing position closing said upper and lower openings, and in a flushing position opening at least said lower opening, control means for carrying out a hot flushing operation after actuation of said main switch and prior to initiating a first brewing cycle, said hot flushing operation control means being effective to initially actuate said control piston drive means until said control piston is in said brewing position, and to subsequently actuate said closure means of said hot water conduit for admitting hot water to said brewing chamber, and control means for carrying out a hot flushing operation between two brewing cycles, said control means being effective to initially actuate said control piston drive means until said control piston is in said flushing position, and to subsequently actuate said closure means of said hot water conduit for admitting hot water to said brewing chamber.

8. A coffee percolator according to one of claims 6 or 7, wherein each position of said control piston within a brewing cycle is sensed by a switch, said control piston being connected to a cam for actuating the switch corresponding to the actual position of said control piston during the displacement thereof.

* * * * *